United States Patent [19]

Chen

[11] Patent Number: 5,196,986
[45] Date of Patent: Mar. 23, 1993

[54] CAPACITOR

[75] Inventor: Cheng-Nan Chen, Taipei, Taiwan

[73] Assignee: VIM Electronic Co., Ltd., Tai-Chung, Taiwan

[21] Appl. No.: 871,716

[22] Filed: Apr. 21, 1992

[51] Int. Cl.$^5$ .............................................. H01G 1/14
[52] U.S. Cl. ...................................................... 361/306
[58] Field of Search .......................... 361/306, 535–540

[56] References Cited

U.S. PATENT DOCUMENTS 5,124,880  6/1992  Okamoto et al. ................... 361/306
5,138,519  8/1992  Stockman ............................ 361/306

Primary Examiner—Donald A. Griffin
Attorney, Agent, or Firm—Morton J. Rosenberg; David I. Klein

[57] ABSTRACT

This invention relates to a capacitor and in particular to one mainly including a cover provided with two parallel ribs, an engaging flange with a raised member, and a plurality of holes, two conducting springs having a body portion with a plurality of projections and a plurality of U-shaped members extending downward to form an inclined member, a fixing plate having a lower portion with a hook member, and a housing formed with a chamber for receiving an insulating material, two recesses for insertion of a wire, and a plurality of slots for engaging with the fixing plate.

1 Claim, 2 Drawing Sheets

CAPACITOR

BACKGROUND OF THE INVENTION

It is found that the prior art capacitor is simply composed of an insulator coated with an alloy of tin and lead. In order to make it easier for soldering, the content of lead in the alloy is increased as much as possible (30%-90%). However, as lead is harmful to the health and environment, it is necessary to be very careful in the manufacturing process.

Therefore, it is an object of the present invention to provide a capacitor which may obviate and mitigate the above-mentioned drawbacks.

SUMMARY OF THE INVENTION

This invention is related to an improved capacitor.

It is the primary object of the present invention to provide a capacitor in which the insulating material may be coated with an inexpensive and nontoxic metal such as Zinc.

It is another object of the present invention to provide a capacitor in which the coating on the insulating material is connected with the terminal without soldering.

It is still another object of the present invention to provide a capacitor in which the housing is connected with the cover by high frequency heating.

It is still another object of the present invention to provide a capacitor which may be connected to desired article in various ways.

It is a further object of the present invention to provide a capacitor which may be conveniently connected in series or in parallel.

Other object and merits and a fuller understanding of the present invention will be obtained by those having ordinary skill in the art when the following detailed description is read in conjunction with the accompanying drawings.

DETAILED DESCRIPTION OF THE PREFERRED EMBODIMENT

Figures 1, 1A:
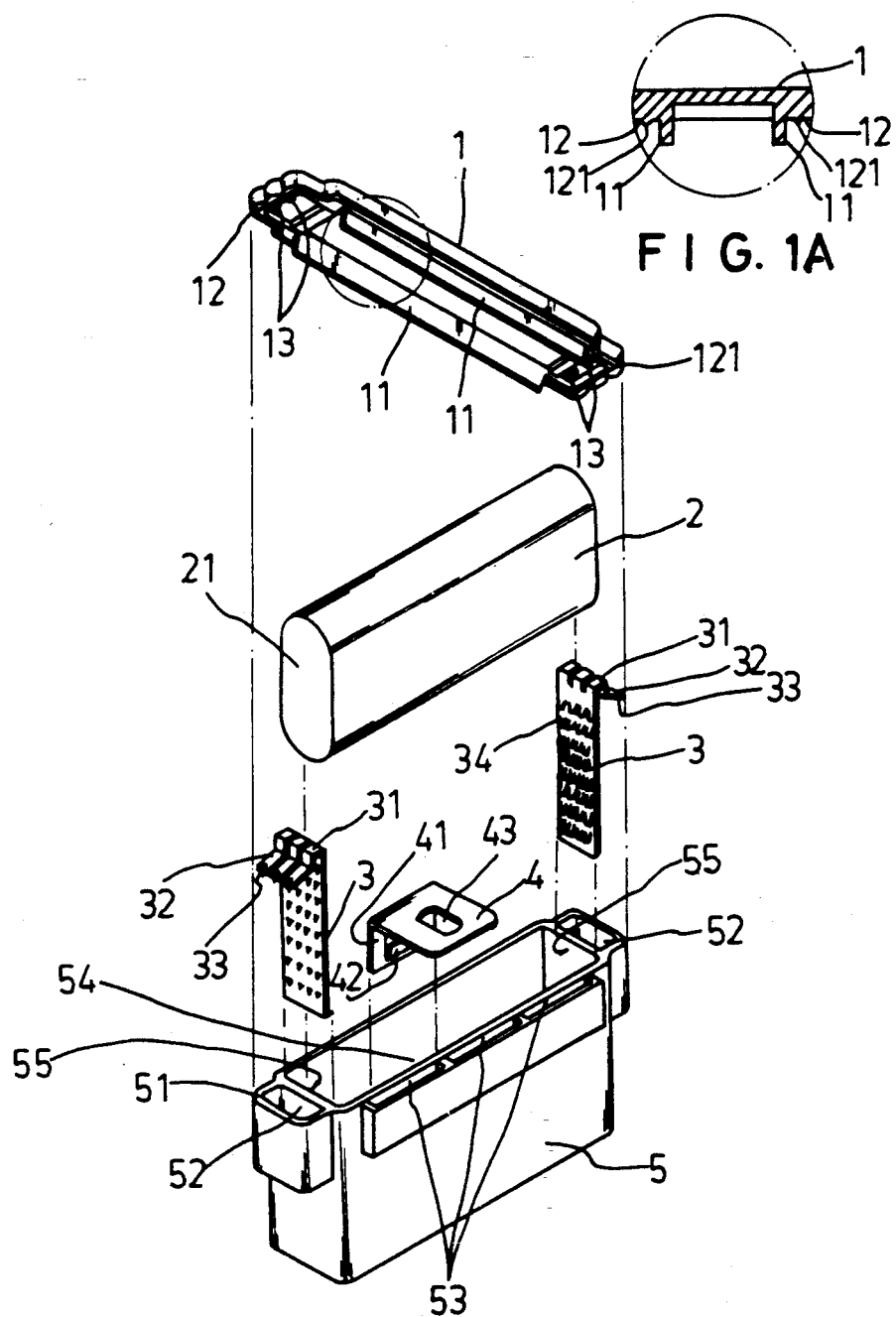
FIG. 1 is an exploded view of present invention.
FIG. 1A is an enlarged fragmentary view of FIG. 1.

With reference to the drawings and in particular to FIG. 1, the capacitor according to the present invention mainly comprises a cover 1, an insulating material 2, two conducting springs 3, a fixing plate 4 and a housing 5.

The cover 1 and the housing 5 are made of nonflammable ABS, PC or PBT and formed by injection moulding.

The cover 1 is provided with two parallel ribs 11 and an engaging flange 12 on which there is a raised member 121 (see FIG. 1A). On both sides of the cover 1 there are a plurality of holes 13.

The insulating material 2 is sprayed with Zn so as to provide conducting surfaces 21 thereto. Zn is cheap in cost and is nontoxic as well.

The conducting springs 3 are made of phosphorous copper and have a plurality of U-shaped members 31 which extend downward to form an inclined member 32. The outer edge of the inclined member 32 is formed with a notch 33. Further, the body portion of the conducting spring 3 is provided with a plurality of projections 34.

The fixing plate 4 is an angular member or a flat member, depending on the way how the capacitor is to be mounted.

The top 51 of the housing 5 has a contour adapted to the cover 1 and further, the housing 5 is provided with a recess 52 at both ends, a plurality of slots 53 at one side, a chamber 54, and two inner end walls 55.

When in assembly, first dispose the two conducting springs 3 into the chamber 54 with the U-shaped members 31 of the conducting spring 3 engaged with the upper edge 55 of the inner end wall 55 of the housing 5. Then, put the insulating material 2 between the two conducting springs 3 with the projections 34 of the conducting spring 3 closely in contact with the conducting surface 21 of the insulating material 2 so that it is unnecessary to solder a terminal or connector to the insulating material. Thereafter, mount the cover 1 on the top of the housing 5 with the ribs 11 of the cover 1 sandwiching the insulating material 2 in the chamber 54 (see FIG. 3). As the cover 1 is mounted on the housing 5, the protuberance 121 of the engaging flange 12 will be closely engaged with the top 51 of the housing 5. Finally, the cover 1 is permanently joined to the housing 5 by high frequency welding.

Figure 3:
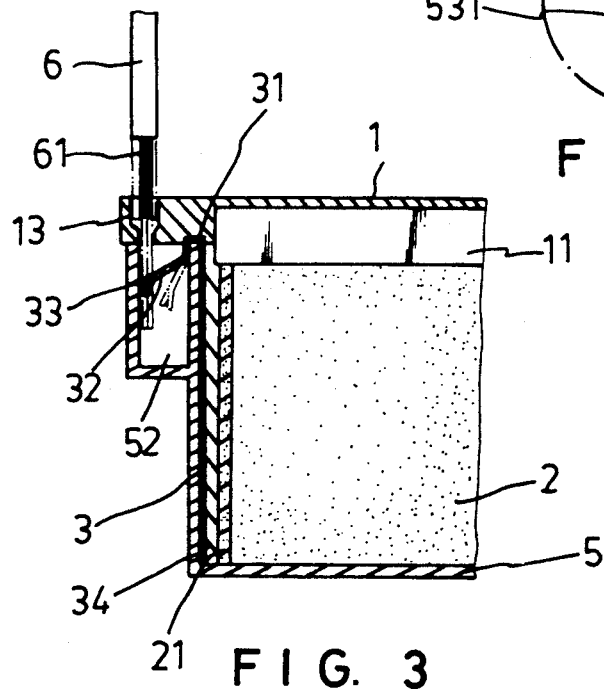
FIG. 3 is a sectional view of FIG. 2.

Looking now at FIG. 3, the U-shaped members 31 of the conducting spring 3 are engaged with the upper edge of the inner wall 55 of the housing 5, with the inclined members 32 received in the recess 52 of the housing 5. The recess 52 is designed for the insertion of a bare portion 61 of a wire 6 through the holes 13 of the cover 1. When the bare portion 61 of the wire 6 is inserted into the notch 33 of the inclined member 32 of the conducting spring 3, the bare portion 61 of the wire 6 will be pressed on the inner side of the recess 52 by the conducting spring 3. Hence, the bare portion 61 of the wire 6 can be fixed in position without soldering.

Figure 2:
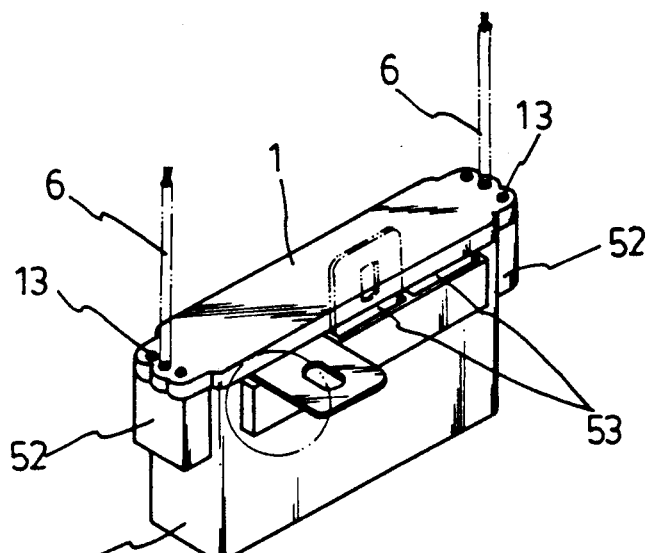
FIG. 2 is a perspective view of the present invention.
Figure 2A:
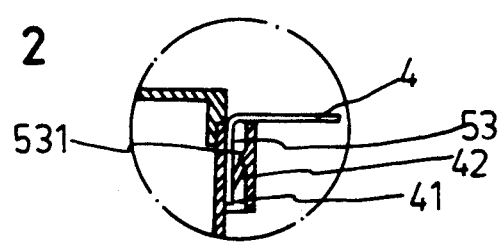
FIG. 2A is an enlarged fragmentary view of FIG. 2.

Referring to FIG. 2A, the fixing plate 4 is provided with a hook member 42 on its lower portion so that when the fixing plate 4 is inserted into the slot 53 of the housing 5, the hook member 42 will be engaged with a stopper 531 of the slot 53. Further, the fixing plate 4 has an opening 43 through which the capacitor may be conveniently attached to desired article.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A capacitor comprising:
   a cover provided with two parallel ribs, an engaging flange on which there is an annular protuberance, and a plurality of holes on both sides;
   two conducting springs having a body portion with a plurality of projections and a plurality of U-shaped members extending downward to form an inclined member, said inclined member being formed with a notch on the outer edge;
   a fixing plate having a lower portion with a hook member; and
   a housing formed with a chamber for receiving an insulating material, two recesses for insertion of a wire, and a plurality of slots for engaging with said fixing plate.

* * * * *